United States Patent [19]

Boute et al.

[11] 4,287,590

[45] Sep. 1, 1981

[54] TIME DIVISION MULTIPLEX COMMUNICATION SYSTEM

[75] Inventors: Raymond T. G. Boute, Antwerp; Wilfried L. J. De Kinder, Kalmthout; Gustaaf W. T. Neutjens, Hoboken; André G. G. Pochet; Jan P. M. Vanderschoot, both of Antwerp; Jacques D. A. Van Remortel, Bazel, all of Belgium

[73] Assignee: International Standard Electric Corporation, New York, N.Y.

[21] Appl. No.: 51,767

[22] Filed: Jun. 25, 1979
(Under 37 CFR 1.47)

[51] Int. Cl.³ .......................................... H04Q 11/04
[52] U.S. Cl. ........................................ 370/59; 37/67
[58] Field of Search .................. 370/59, 67, 58, 65, 370/66, 63

[56] References Cited

U.S. PATENT DOCUMENTS

| | | | |
|---|---|---|---|
| 3,740,482 | 6/1973 | Plank et al. | 370/67 |
| 3,740,484 | 6/1973 | Laggy et al. | 370/67 |
| 4,025,725 | 5/1977 | Euler | 370/66 |
| 4,138,597 | 2/1979 | Ashford | 370/67 |
| 4,162,375 | 7/1979 | Schlichte | 370/59 |

FOREIGN PATENT DOCUMENTS 2819126 3/1979 Fed. Rep. of Germany ............ 370/59

Primary Examiner—Douglas W. Olms
Attorney, Agent, or Firm—James B. Raden; Marvin M. Chaban

[57] ABSTRACT

A time division multiplex communication system comprised of a plurality of modules, each module being equipped with a space division concentrator and a processor. The modules are interconnected by a control bus and by a plurality of speech busses, the number of speech busses being equal to the maximum number of modules. All busses are connected to each equipped module. The control bus is commonly connected to all modules and this bus is, in turn, controlled by a control circuit. In the control circuit, there is a flip-flop for each module for enabling a scanner in the control circuit to set the address of a module seeking use of the control bus. The processor in the module seeking service recognizes its address and transmits its call processing data on the control bus. Each speech bus is comprised of eight wires for parallel PCM bit transmission with time slot interchanging.

12 Claims, 8 Drawing Figures

| | SMTB | |
|---|---|---|
| A | SM | |
| 0 | 4 | |
| 1 | 13 | |
| 2 | 14 | |
| 3 | 5 | |
| 4 | 13 | |
| — | 6 | |
| — | 23 | |
| — | 0 | |
| — | 0 | |
| — | 0 | |
| 31 | 0 | |

Fig.4.

| | RTB | | | | F |
|---|---|---|---|---|---|
| J | DEST | S.T.S | | S M | |
| 0 | 31 | 0 | | 4 | 1 |
| 1 | 8 | 0 | | 13 | |
| 2 | 7 | 0 | | 14 | |
| 3 | 16 | 1 | | 5 | |
| 4 | 12 | 2 | | 13 | |
| 5 | 0 | 2 | | 6 | |
| 6 | 4 | 31 | | 23 | |
| 7 | 0 | 0 | | 0 | |
| — | 0 | 0 | | 0 | |
| — | 0 | — | | 0 | |
| 31 | 0 | 0 | | 0 | 0 |

Fig.5.

| | SJTB | |
|---|---|---|
| V | SJ | |
| 0 | 0 | 1 |
| 1 | 0 | 1 |
| 2 | 0 | — |
| — | 1 | — |
| — | 2 | — |
| — | 2 | — |
| — | 31 | 0 |
| — | 0 | 0 |
| — | 0 | 0 |
| — | 0 | 0 |
| 31 | 0 | 0 |

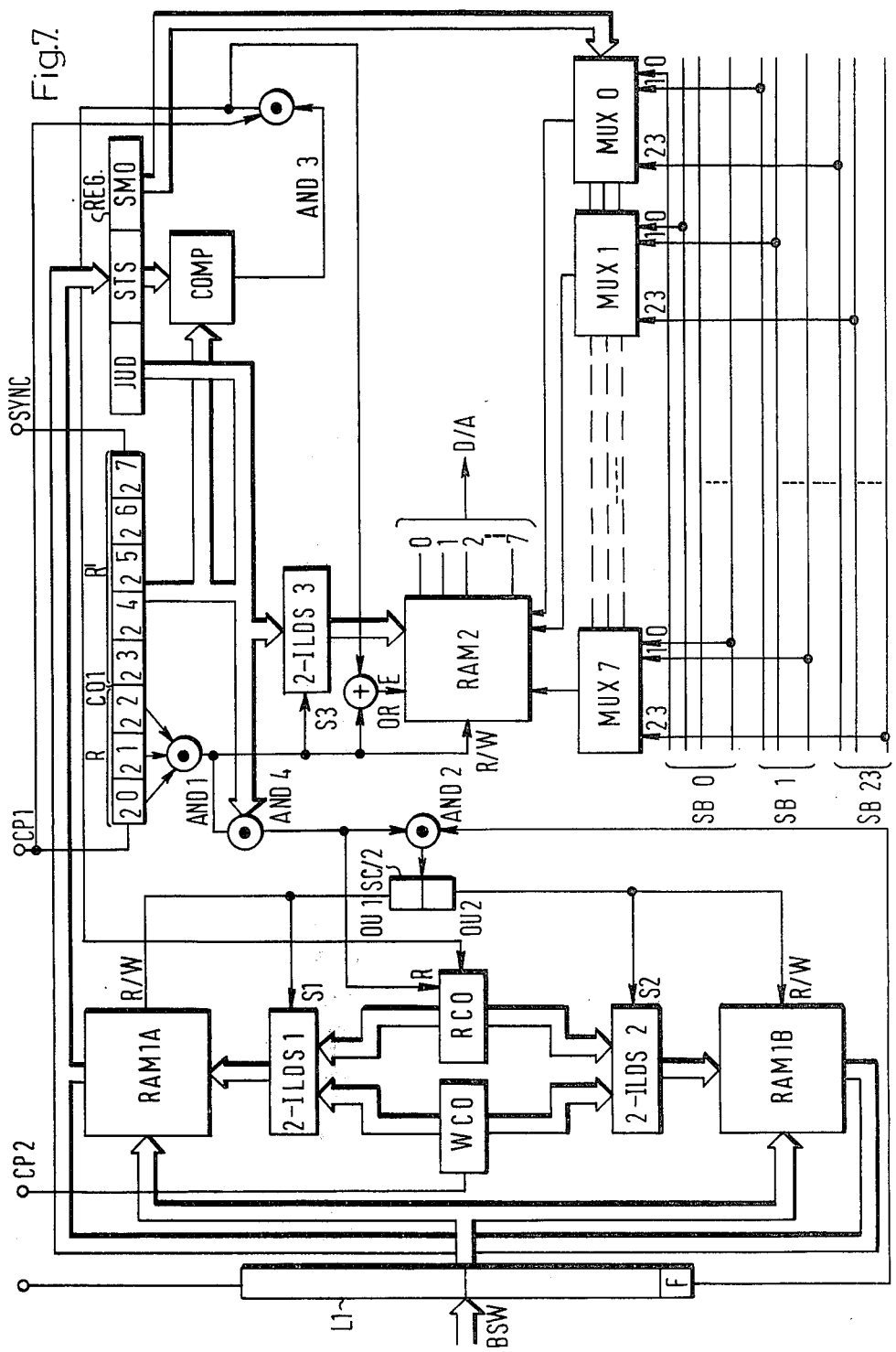

TIME DIVISION MULTIPLEX COMMUNICATION SYSTEM

The invention relates to a Time Division Multiplex (TDM) communication system including a plurality of TDM busses able to exchange signals through time slots on said busses and each time slot being divided into a number of time intervals.

Such a communication system is known for instance from the article by P. VOYER, M. BALLARD, B. LEDIEU "Réseaux de connexion temporels à grande capacité" published on pages 52 to 70 of Communication & Electronique No. 43, October 1973.

On pages 56 and 57 of this article a system is described and more particularly a PCM multiplex time switch by means of which N input TDM busses with 32 time slots can be coupled with the same number of like output TDM busses. The time slots of a frame containing 32 time slots are each divided into N+1 equal time intervals of $$\frac{125}{32(N+1)}$$

microseconds, each incoming signal being sampled at an 8 KHz rate. In the example shown N=32 so that the above equal time intervals are of the order of 120 nanoseconds. During the first time interval of a time slot the coded information of the N input busses is registered in the N memories of the PCM switch while during the N following time intervals of that time slot the information stored in the above N memories is deviated to the N output busses. Thus, the switching speed required increases linearly with N. This limits the upper value of N defining the size of such a square (N×N) PCM multiplex time switch in function of the maximum speed allowed by the technology to be used.

As explained on pages 57 and 58 of the article, a time interval four times as long could be kept but at the expense of using more equipment by multipling the N input busses on four time switches each giving access to one fourth of the N output busses.

Thus, if it is desired to use integrated or LSI circuits in today's less expensive MOS technology requiring a lower limit of some 500 nanoseconds for the shortest time interval, one must either limit the size of the switch or use additional equipment.

This is especially undesirable if one considers PCM switching exchanges of a relatively small size such as rural or suburban exchanges for instance. Even in such a case, the single PCM multiplex time switch considered above is not ideal because it is not flexible enough in providing for a gradual growth of the exchange from a very low initial size of say 100 lines to an ultimate capacity of say 4,000 lines.

This basic problem is on the other hand well known and the arrival of the microprocessor era now enables exchanges of this type to be considered, or even those of a larger size, which can be divided into suitable units or modules, not only in what concerns the switches but also for the control equipment. It is indeed for the latter that the small exchanges, or all those starting at an initially low capacity, present the most severe problem as a processor system acceptable for the large size becomes an untolerable burden on the smaller exchanges. Yet so far, solutions of this problem resorting to a plurality of microprocessors for the control of the exchange have not removed the basic need for some hierarchy of programme controlled processors, there being at least some master processor intervening in the execution of some of the tasks necessary to control the establishment of a connection between two terminal circuits, e.g. subscriber or trunk line.

An object of the invention is to be able to avoid the need for a master processor to intervene in the establishment of connections in a modular TDM communication system using one or more units while keeping a simple and economical switching structure and avoiding expensive very high speed technology.

In accordance with a feature of the invention, a TDM communication system as initially defined is characterized in that it is made out of a plurality of units interconnected by said busses, each connected to a plurality of terminal circuits and each including a space switchable to forward, during successive time intervals of a time slot, successive communication samples from distinct busses towards a time switch able to shift all said samples to another time slot and under the control of signal processing means individual to the unit.

A system of the above type no longer uses a multiplex space or time switch but each modular unit contains a single space switch which can access TDM busses coming from this or other units and convert an incoming communication from an incoming time slot to one which is free inside the unit. Thus, if say local units giving access to subscribers lines each include a 4 to 1 traffic concentrator for instance, some 128 subscribers each originating a traffic of say 0.15 Erlang may be connected to a 32 time slot outgoing TDM bus going towards this and other units to enable PCM communications.

But if such a system is to avoid the need of a master processor by resorting essentially to one microprocessor for each switching unit resulting in a system which is equally economic at both ends of the size range, including initial sizes of exchanges, one must avoid large exchanges of information between the two microprocessors involved in establishing and controlling a connection between subscribers or circuits connected to the respective units. Thus, it would be desirable to avoid so-called conjugate selection. In other words, junctor circuits in the calling and called units should be selected independently and indeed the proposed system enables this by converting from the calling to the called time slot. However, such a system would normally imply that the space switch of each unit should be able to access all the TDM busses from the other units during any time slot and for a given technology this may lead to the above speed problem when the number of units grows, say up to 24 modules of 128 subscribers originating a traffic of 0.15 or 0.2 E.

Another object of the invention is to provide a modular TDM communication system using a relatively low speed, e.g. MOS technology, limited exchange of control information between micro-processors associated with each modular switching unit and yet avoiding call blocking problems as the number of modules increases.

In accordance with another feature of the invention, the number of time intervals of each time slot is less than the number of said units.

Thus, in an exchange able to grow up to the equivalent of 24 modules of 128 subscribers lines, it has been found that even if the number of time intervals into which each time slot is divided is restricted to 7, the fact that each unit can only reach any 7 out of the 24 incoming TDM busses during a time slot will not produce an intolerable increase in the blocking probability. Surprisingly in fact, for the traffic mentioned, the increase will nevertheless keep the blocking probability caused by this restriction in the TDM bus access well below the blocking probability due to the 4 to 1 concentrators enabling each unit to connect 128 subscribers to the 32 time slots of its TDM bus.

A calculation of this blocking probability appears at the end of the detailed description of the preferred embodiment and naturally, it takes into account the go and return connections which are in fact involved for each such PCM communication. Indeed, in either the calling or called module, knowing the identity of the other module enables the space switch to reach the corresponding bus during one of the available 7 time intervals of the time slot used for the incoming communication from the calling or the called subscriber for the purpose of establishing a go PCM path (from calling to called) and a return PCM path (from called to calling), 2-wire single bidirectional paths being retained in the two space concentrators.

Thus, no resort need be made to conjugate selection to reduce the blocking probability and only microprocessors in the modular units need intervene for the establishment of a call with a limited interchange of control signals, each essentially processing the setting up of the communication in the respective calling and called modules. Naturally, such an exchange which can thus function as an unattended one, eventually with some microprocessor duplication, can be controlled from a distant master exchange, e.g. for general maintenance purpose. In that case, the processor of the master exchange can communicate with the unattended exchange through data channels afforded by one or more PCM channels, i.e. time slots.

In a preferred embodiment the TDM communication system includes 24 autonomously operating modules a number of which may be trunk modules, the remaining number being line modules. Each module includes a control circuit with its own microprocessor and associated memories and peripheral circuitry. All the control circuits are interconnected by means of a common control bus on which the calling module broadcasts the destination of the call and which can be picked up for processing by the called module. Each of the modules is further connected to an outgoing TDM bus via which the speech information is interchanged with the other modules in a PCM mode. The receiver circuit of each module is connected to all 24 speech TDM busses and can select therefrom the information for this module. Instead of being divided into at least 24 equal time intervals each time slot is divided into 8 equal time intervals. During the 7 first time intervals the receiver circuits may receive successively speech information from 7 different selected source modules to which a same time slot has been allotted and which are stored in memory in the order of the time slot of destination, while during the eighth time interval of each succeeding time slot the above memory is read out in a cyclic way. The blocking probability of the system remains below an acceptable limit for normal traffic requirements and, for local line modules for instance it is essentially that caused by the 4 to 1 concentrator connecting the 128 subscribers to the 32 speech channels of the outgoing TDM bus or to the incoming speech channels.

The above mentioned and other objects and features of the invention will become more apparent and the invention itself will be best understood by referring to the following description of an embodiment taken in conjunction with the accompanying drawings in which:

FIG. 3 is a signal sampling time diagram of the system operating by PCM;

FIG. 4 shows a table indicating the routine for each effective communication;

FIGS. 5 and 6 show additional tables serving to draw up the table of FIG. 4;

FIG. 7 is a block diagram of a PCM switch forming part of the receiving circuit of the module shown in FIG. 2;

Figure 1:
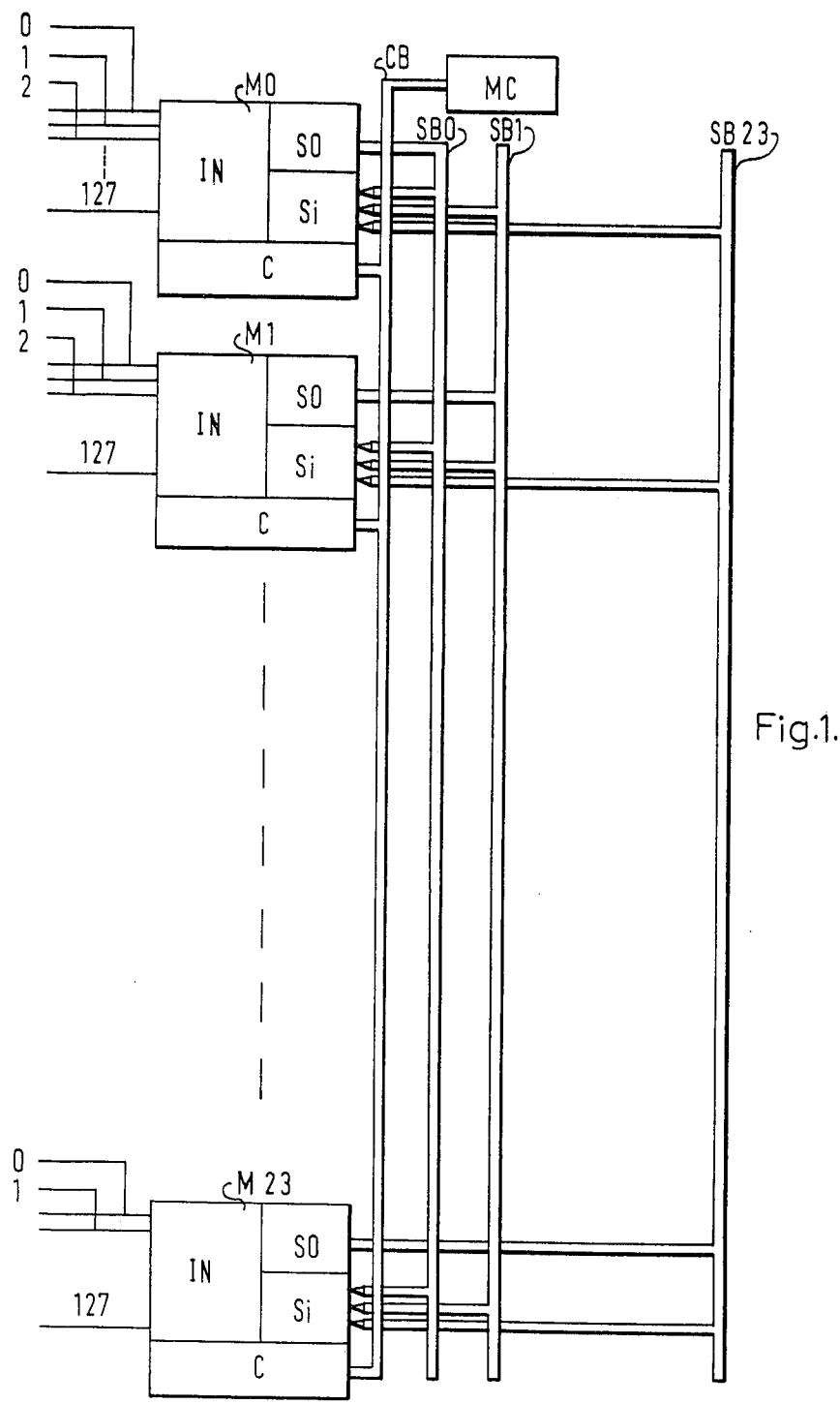
FIG. 1 is a block diagram of a telecommunication system according to the invention showing modules M0 to M23 interlinked by means of data and speech busses.

Referring to FIG. 1 the telecommunication system shown therein includes 24 units or modules M0 to M23 only three of which are shown. A number of these modules may be constituted by a number of line modules and a remainder and generally smaller number of trunk modules each of the latter being used to interconnect a distant exchange by means of a trunk line. Each module Mi (i=0, ..., 23) includes an input circuit IN, a receiver circuit Si, an output circuit SO and a control circuit C with its associated peripheral circuitry. In what follows it is assumed that the telecommunication system only includes line modules, there being no fundamental difference between line and trunk modules. 128 incoming lines 0 to 127 are connected to the input circuit of each line module whilst the output circuit SO of each module is connected to an individual 8 wire speech bus SBi (i=0 to 23), the receiver circuit Si of each module being connected to all speech busses SB0 to SB23 as shown. Along these speech busses only speech information is exchanged between modules in a PCM mode each analog sample being coded into an 8 bit code. These eight bits are sent in parallel over the speech bus. All the control circuits C of the modules are interconnected by means of a control bus CB which terminates on a bus control circuit MC. This control bus is the traffic highway via which the processors of the different control circuits C exchange their data information under control of the bus control circuit MC which will briefly be described later.

Figure 2:
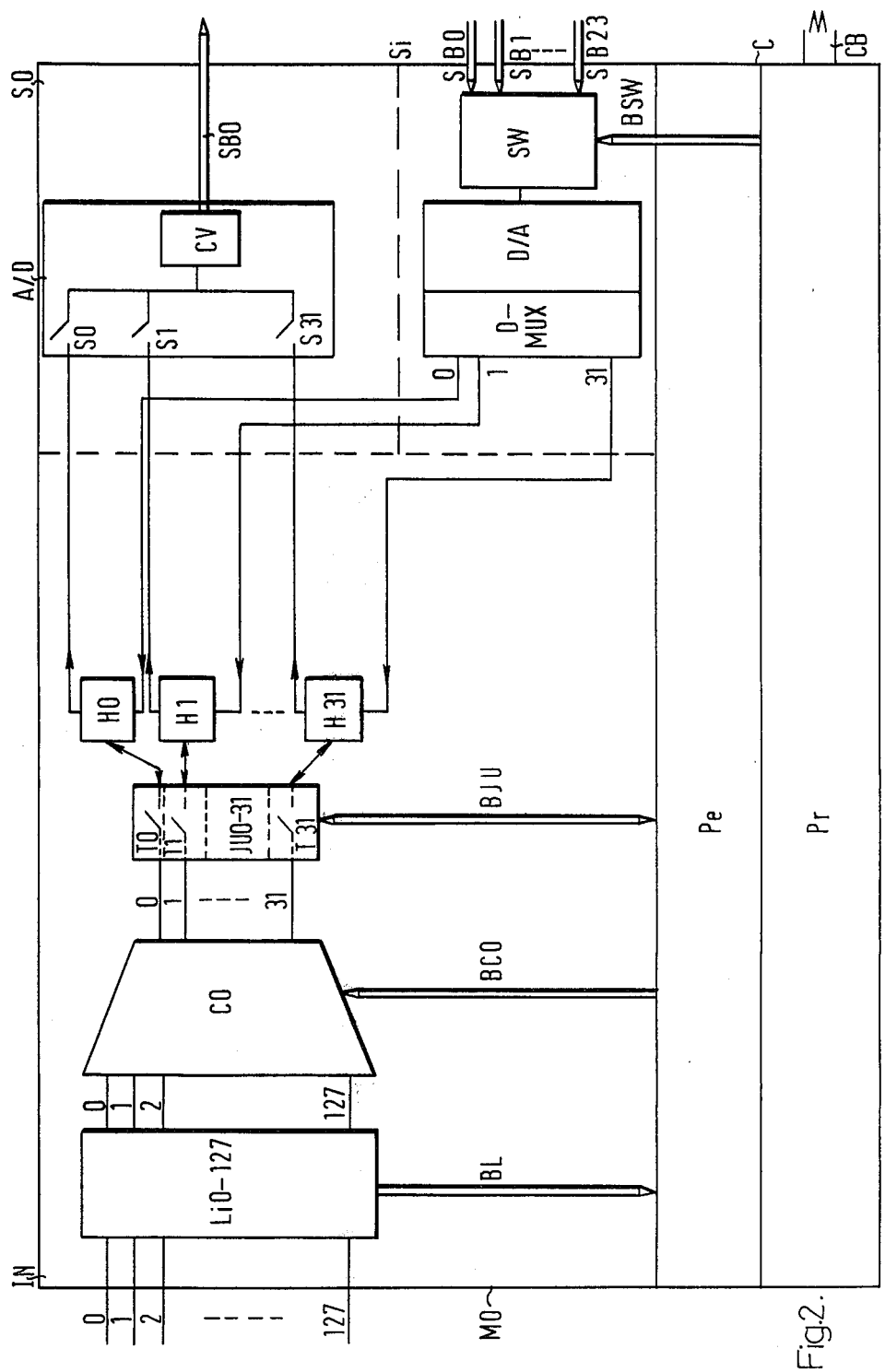
FIG. 2 is a block diagram of a module shown in FIG. 1.

The input circuit IN of the line module M0 for instance, shown in FIG. 2, includes 128 line circuits Li 0-127, a concentrator network CO, 32 junctor circuits Ju 0-31 with connecting through switches T0 to T31 respectively and 32 hybrid circuits H0 to H31.

The output circuit SO includes an analog to digital converter circuit A/D generally known in the art. This converter circuit includes sample circuits S0 to S31 and a converter circuit to code the sampled values. The input and output of this converter circuit are connected to the common output of sampler circuits S0 to S31 and to a corresponding speech bus SB0 respectively.

The receiver circuit Si includes a PCM switch SW a block diagram of which is shown on FIG. 7 and an associated digital to analog converter D/A and above mentioned demultiplexer D-MUX also generally known in the art. The latter demultiplexer is able to connect the D/A output to each of the outputs 0 to 31 of the D-MUX. The 24 inputs 0 to 23 of the switch SW are connected to the speech busses SB0 to SB23, as shown on FIG. 1, respectively. Each of the line circuits Li0–127 is connected to an incoming line 0 to 127 respectively and is able to detect the line loop condition of the associated line. The concentrator network CO which concentrates the 128 incoming lines to 32 concentrated ones is a two stage switching network. The first and second stages each include 8 matrixes of 16×8 and 8×4 crosspoints respectively and provide a single path between any incoming line and any concentrated line. After the detection of a free junctor and a free path in the two-stage switching network connecting this free junctor with a called or calling subscriber, the junctor circuit then feeds the calling or called subscriber's subset and sends tone or ringing signals via such a path. The input legs of the hybrid circuits H0 to H31 are connected to the concentrated lines 0 to 31 via the above connecting through switches T0 to T31 respectively. One of the two output legs of hybrid circuits H0 to H31 are coupled to the inputs of sampler circuits S0 to S31 respectively. The other output leg is coupled to a corresponding output of the 32 outputs (0 to 31) of the demultiplexer D-MUX.

Figure 8:
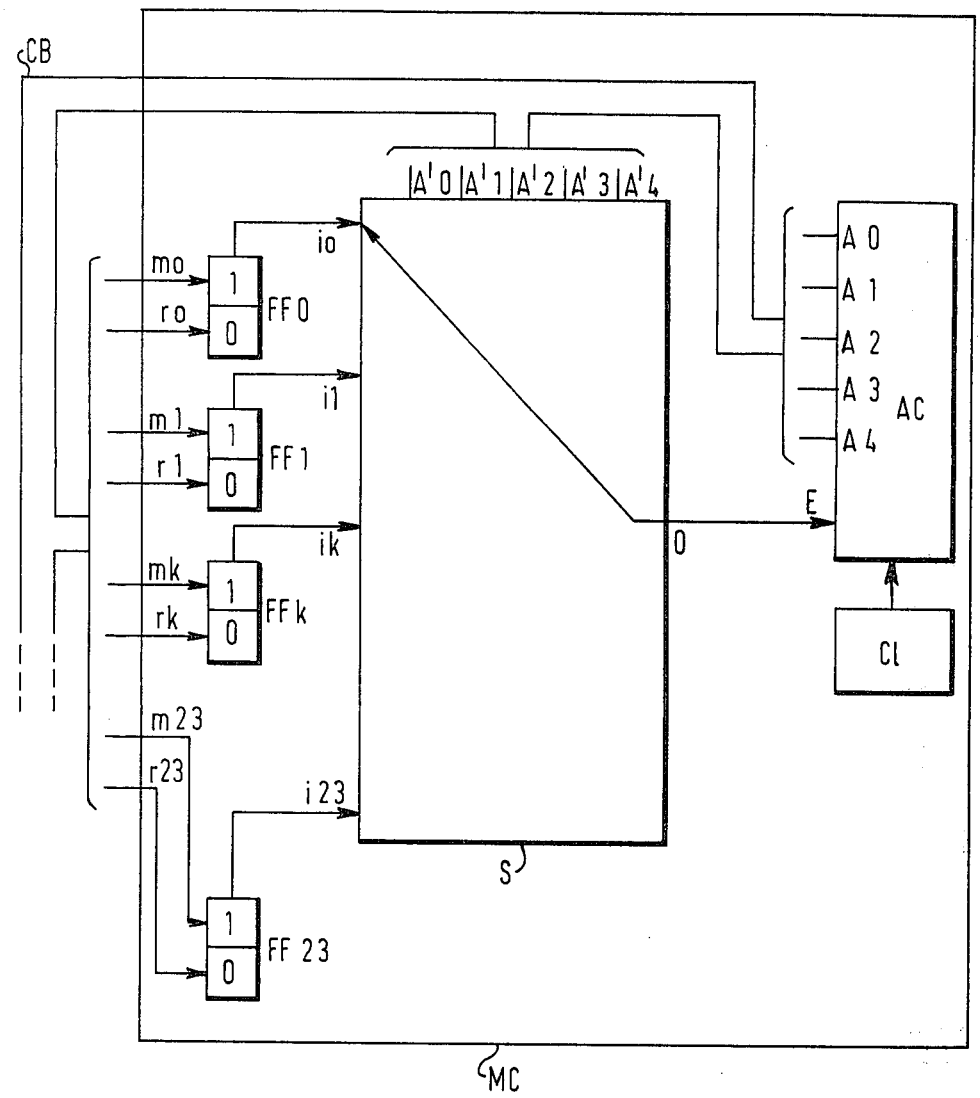
FIG. 8 is a schematic representation of a data bus control circuit.

The control circuit C includes the necessary peripheral circuitry Pe to supervise, operate or control the circuits of the input circuit IN and the receiver circuit Si under the general control of the processor Pr. Therefore the line circuits Li0–127, the concentrator network CO, junctor circuits Ju0–31 and the PCM switch SW are interlinked with the peripheral circuitry via the busses BL, BCO, BJu and BSW respectively, but no details are shown neither of the peripheral circuitry nor of the processor since known circuits can be used and are not related to the present invention. As mentioned above the control bus CB is the highway via which the processors of the different control circuits C exchange their data information with each other. When this control bus is engaged, i.e. when the processors of two modules Mi and Mj are exchanging data information, the bus control circuit MC prevents any other module to use this control bus. The bus control circuit is shown schematically in FIG. 8 and is described in so far as necessary for an understanding of the invention.

This M-bus control circuit MC (FIG. 8) mainly includes flipflops FF0 to FF23, scanner S and address counter AC with clockpulse generator C1. The 1-inputs and the 0-inputs of the flipflops FF0 to FF23 are connected to the control circuits C of the modules M0 to M23 via individual wires m0 to m23 and r0 to r23 respectively. The i-outputs of the above flipflops are connected to the inputs i0 to i23 of scanner S respectively. This scanner is able to connect an input ik with the output 0 when it is addressed at address inputs A'0 to A'4 (via bus CB) with the address of the above input terminal. Input terminals i0 to i23 and the corresponding modules M0 to M23 have the same address respectively. The above addresses are provided by means of an address counter AC. This counter is stepped by means of the clockpulse generator C1. The address inputs A'0, A'1 ... A'4 of scanner S and the corresponding address outputs A0, ... A4 of counter AC are connected in parallel and reach all modules M0 to M23 via the control bus CB. The output 0 of scanner S is connected to enable/disable input E of the address counter AC.

The M-bus control circuit operates as follows. When a particular originating module Mk desires to use the control bus CB to send data to a module of destination, its processor sets the corresponding flipflop FFk. When the corresponding input ik is scanned, the address counter AC is stopped due to its disabling input being activated. The address of module Mk is now applied to all modules but only Mk recognizes it. The microprocessor of the control circuit of this module now takes the necessary actions to send its data on the control bus. When the module Mk does no longer need the control bus, it resets the flipflop FFk whereby counter AC starts stepping again until selector S detects a second 1-state.

As mentioned earlier the speech information is exchanged between two subscribers via the speech busses in a PCM mode. Each speech bus has 8 wires to convey parallelly the 8 bits characterizing each sampled speech sample. To make this clear reference is made to FIGS. 2 and 3. In each module speech signals may be transmitted from subscribers in the direction of the output circuit SO via 32 speech channels each comprising a concentrated line i at the output of CO, a junctor circuit Jui, a hybrid circuit Hi. These speech signals are multiplexed, i.e. the signals of each channel are sampled at a 8 KHz rate by the sampler circuits S0 to S31 whereby time frames DT of 125 microseconds time interval are formed, the moments of sampling of a channel being shifted with respect to a preceding one by a channel time interval of 125/32 microseconds. Each frame is thus divided into 32 time slots DT1 (1=0 to 31 ) each having a time interval of about 4 microseconds and each being associated with a different one of the 32 junctor circuits.

In principle it would be desirable that 24 subscribers each connected to a different module but to which a same time slot has been allotted could communicate with subscribers connected to the same or different modules. However, as mentioned in the opening part of the description, this would imply that each time slot DTi is divided into at least 24 equal time intervals a different time interval being then reserved for each of the 24 subscribers and this would exclude the use of the present MOS technology which does not allow such speeds. For reasons which will become clear later each time slot DTi is only divided into eight equal time intervals Dtij (i=0, 1, ..., 31; j=0, 1, ..., 7).

The essential points of the setting up of paths involving various line modules will be described hereinafter. It is supposed that a connection has to be established between one or more calling subscribers connected to the modules M4, M5, M6, M13, M14, M23 and the corresponding called subscribers all connected to module M23. When the calling subscribers lift their telephone handset whereby they are connected to their corresponding line circuits a free path is searched to a free junctor circuit via the concentrator network CO. It is supposed that after the above free paths have been found and established the calling subscribers belonging to modules M4, M5, M6, M14 and M23 are connected to the junctors Ju0, Ju1, Ju2, Ju0 and Ju31 in the corresponding modules respectively and that two calling subscribers both belonging to module M13 are connected to junctors Ju0 and Ju2 in these modules. In what follows these modules and junctors will be called source module and source junctors respectively. It is also assumed that time slots DT0, DT1, DT2, DT31 are allotted to the subscribers connected to the source junctors Ju0, Ju1, Ju2 and Ju31 respectively. This means that a same time slot such as DT0 and DT2 is assigned to different subscribers. Therefore different time intervals of the same time slot are associated with these subscribers. In the example described time intervals Dt00, Dt01, Dt02 are assigned to subscribers connected to source modules M4, M13, M14 respectively, whereas time intervals Dt20 and Dt21 are assigned to a second calling subscriber connected to source module M13 and to the subscriber connected to source module M6 respectively. Also, time slot intervals Dt10 and Dt30 are further assigned to the subscribers connected to source modules M5 and M23 respectively.

To make the above clearer the following table shows the source modules (SM0) and corresponding source junctors (SJu), source time slots (STS) and source time slot intervals (STSI).

| SMO | SJu | STS | STSI |
|-----|-----|------|------|
| M4  | Ju0 | DT0  | Dt00 |
| M5  | Ju1 | DT1  | Dt10 |
| M6  | Ju2 | DT2  | Dt21 |
| M13 | Ju0 | DT0  | Dt01 |
|     | Ju2 | DT2  | Dt20 |
| M14 | Ju0 | DT0  | Dt02 |
| M23 | Ju31| DT31 | Dt30 |

When the above connections between the source junctors and the corresponding calling subscribers have been established a dial tone is sent to the latter who are now allowed to form the called subscriber's number. This number is now registered in the memory of the control circuit of the corresponding source modules. The processor of each of these source modules now addresses all the modules in parallel via the control bus CB with the request to check the presence of the called subscriber's number in their configuration table, each module being responsive to two addresses: a first one which is its own address and a second one common to all modules. This configuration table in each of the modules includes identity information concerning line circuits, subscribers line class junctor circuits, etc. In the example chosen, module M23 which is the module of destination and to which all called subscribers are connected will reply sending its identity in turn to each of the source modules it being remembered that the control bus is only accessible for one module at a time. Each of the source modules addresses the module of destination (M23 in this case) in turn transmitting hereby the called subscriber's number in coded form. Different possibilities may now arise such as for instance: the called number is an unallotted one or the called subscriber is busy or is free. In the first case no answer is received by the source module which after a given time limit releases the path established between the calling subscriber and the corresponding junctor circuit. In the second case the module of destination (M23) sends a busy signal via the control bus to the source modules which transmit this busy condition to the calling subscribers. In the third case the module M23 sends an answer signal via the control bus to the source modules (M4, M5, M6, M13, M14, M23) indicating that a free path to the called subscribers in its module is being reserved and established between the junctor circuits and the free called subscribers. In the example chosen, a free path is established between junctor circuits of destination (called junctor of destination) 31, 8, 7, 16, 12, 0 and 4, and the corresponding called subscribers all connected to the module M23, it being assumed that these called subscribers are to be connected with the calling subscribers connected to source junctors Ju0 in M4, Ju0 in M13, Ju0 in M14, Ju1 in M5, Ju2 in M13, Ju2 in M6 and Ju31 in M23 respectively. The corresponding time slots DT31, DT8, DT7, DT16, DT12, DT0 and DT4 are reserved.

In the memory of the processor of the module of destination (M23) a source junctor table (SJTB shown in FIG. 5), a source module table (SMTB shown in FIG. 6) and a routing table (RTB shown in FIG. 4) are built and ringing current and ringing tone are sent to the called and calling subscribers respectively. The memory of the processor of each module contains similar tables SJTB, SMTB and RTB as shown on FIGS. 5, 6 and 4 respectively and which characterize the state of connections to be established between the particular module and other ones. The SJTB and SMTB tables both include two columns whilst the RTB table which is derived from the two preceding tables has four columns, all tables having 32 lines. In the second column (SJu) of SJTB the binary addresses (5 bits) of the source junctors (in the source modules) are stored whilst in the first column a bit V indicates that the connection is in the process of being established, i.e. when the paths between the calling and called subscribers and their junctors have been established the called subscriber not having hooked off yet. In the second column (SMO) of the source module table (SMTB) the binary addresses (5 bits) of the source modules are memorized. A bit A in the first column is set when a connection is really established, i.e. when a called subscriber hooks off. In a first one (JuDEST) of the four columns of RTB the addresses of the junctor of destination are registered whilst in the second (STS) and third (SMO) column the source time slots (STS) or source junctor addresses and the addresses of the source modules (SMO) are memorized on the corresponding lines respectively. A bit F is set in the last column on the last line (31). When this is detected by the processor the contents of the RTB is copied into the memory of the PCM switch as explained below. It is to be noted that the information in RTB and SJTB is arranged therein following increasing order of the source time slot as shown in FIGS. 4 and 5, that when the table is not completely filled with information it is completed with zeros as shown and that although not shown in this particular example certain lines may contain information concerning established communications, this information together with information concerning new calls to be processed are arranged following the above mentioned increasing order.

When a called subscriber goes off hook, the processor of the module of the called subscriber sends a message to the processor of the source module and the following happens.

The ringing current and ringing tone sent to the called and calling subscribers respectively are stopped by means not shown.

The corresponding bit A of the calling subscriber as well as of subscribers which may not have hooked off yet are set in SMTB.

If it is supposed that the subscriber connected to junctor Ju31 in module M31 and called for module M4 hooks off. The connecting through switches T31 and T0 in modules M31 and M4 are closed respectively, so that the following connections are established.

(1) In the direction M4 to M31 via switch T0, hybrid circuit H0, A/D converter (sampler circuit S0) in module M4, speech bus SB4 and then PCM switch SW, D/A converter, D-MUX (output 31), H31, T31 in module M31.

(2) In the direction M31 to M4 via switch T31, hybrid circuit H31, A/D converter (sampler 31) in module M31, speech bus SB31 and then PCM switch SW, D/A converter, D-MUX (output 0), HO, TO in module M4.

Referring to FIG. 7, the PCM switch SW shown therein will now be described. This switch mainly includes the following parts: data selectors MUX0 to MUX7 to select data from a predetermined data bus of the 24 data busses SB0 to SB23 when these selectors are addressed with the corresponding bus address and a time slot interchanger. This time slot interchanger mainly includes a latch L1, switchable random access memories RAM1A, RAM1B and associated write counter WC0, read counter RC0, two 2-1 line data selectors 2-1LDS1 and 2-1LDS2 and a scale-of-2 SC/S; a random access memory RAM2 and associated 8 bit binary counter CO1, 2-1 line data selector 2-1 LDS3, register REG, comparator COMP, AND-gates AND 1, AND2, AND3, AND4 and OR-gate OR.

The counter CO1 is divided into a part R with stages $2^0$, $2^1$, $2^2$ and a part R' with stages $2^3$ to $2^7$. The read-write functions of the above switchable memories RAM1A and RAM1B can be interchanged so that when one of these memories is being read out information from RTB is copied into the other memory. The data selectors 2-1 LDS1 and 2-1 LDS2 allow the memories RAM1A and RAM1B to be addressed by the addresses formed by the write (WC0) or read (RC0) counters. The scale of two SC'/2 has two outputs OU1 and OU2. Output OU1 is connected to the read-write input R/W of RAM1A and to the selecting input S1 of the 2-1 line data selector 2-1 LDS1. In the same way, OU2 is connected to the read-write input R/W of RAM1B and to the selecting input S2 of the 2-1 line data selector 2-1 LDS2. The complementary outputs OU1 and OU2 are alternatively low and high with the arrival of a pulse applied at the input via the AND-gate AND2. When for instance the outputs OU1 and OU2 are high and low respectively the read input R of RAM1A and the write input W of RAM1B and the selecting input S1 of 2-1 LDS1 are activated whilst the selecting input S2 is deactivated. This means that the information from RTB is copied into RAM1B via the latch L1, this memory being addressed via the 2-1 LDS2 with the address of counter WC0 and that at the same time RAM1A is read-out, the read-out address being applied from the read counter RC0 via the 2-1 LDS1.

When the scale-of-two SC/2 changes state the memories RAM1B and RAM1A become a "read-RAM" and a "write-RAM" respectively. It should be noted that the latch LA is a 16-bit latch to allow the 15-bit words of the RTB to be copied into the RAM1A or 1B and to allow bit F associated with the last word to be copied to set the 16th latch stage which thus activates one of the inputs of the AND-gate AND2. Triggering of SC/2 occurs when the other input of AND-gate AND2 is activated, i.e. when the output of the AND-gate AND4 is high. This AND-gate has six inputs five of which are connected with a different stage of part R' of the counter CO1, the 6th input being connected with the output of AND-gate AND1 so that the output of AND4 is activated when binary counter CO1 has counted 256, i.e. at the occurrence of "the last" time interval of the 32nd time slot 31. Then the counter RCO is reset via input R. This counter RCO is stepped when the output of AND-gate AND3 is activated. The output of gate AND3 is activated when both a clock pulse CP1 is present and the output of the comparator COMP is high. The counter WCO is stepped by means of an external clock pulse CP2 fed by a clockpulse circuit (not shown) which is controlled by the processor. The counters CO1 of the switches SW of all modules are synchronized by means of a synchronizing pulse SYNC. The information read out from memories RAM1A or RAM1B is stored into the 15-bit register REG. This register is divided into three parts: JuD, STS and SMO of 5 bits each and used to store the addresses of the junctor destination, the source time slot and the source module respectively.

The random access memory RAM2 is used to store the speech data selected from the appropriate speech bus by means of the data selectors MUX0 to MUX7, when these selectors are addressed by the address of this speech bus or associated calling or source module. Every time the three bit part R of counter CO1 has counted eight the output of the AND-gate AND1 is activated so that consequently the read input R and the enabling input E of the memory RAM2 and enabling input S3 of the 2-1 line data selector 2-1 LDS3 are activated. When this happens the memory RAM2 is addressed with the address stored in the part R' of counter CO1 via the 2-1 LDS3. The information at the above address location is then read out from the above memory and the data obtained is decoded and demultiplexed and appears on one of the outputs 0 to 31 of the demultiplexer D-MUX (FIG. 2). On the contrary, when the part R of counter CO1 has not counted eight the output of the AND-gate AND1 is deactivated as well as the enabling input S2 of the 2-1 LDS3, but the write input W of the memory RAM2 now being activated, the memory RAM2 is addressed with the address stored in the left five stage part (JuD) of register REG via 2-1 LDS3. Every time when this happens, the speech information taken from a speech bus by the selector MUX0 to MUX7 is registered in the memory RAM2 at the above address location. These data selectors are addressed by means of the address stored in the righthand 5 stage part (SMO) of register REG. The address in the part R' of counter CO1 is compared with the address stored in the middle part STS of register REG, this latter address being that of the source time slot. The output of the comparator COMP is activated only when the above addresses are equal. When this happens the AND-gate AND3 is enabled at the arrival of a clock pulse CP1.

The PCM switch SW operates as follows. It is supposed that the information from RTB has been copied into the memory RAM1A so that AND-gate AND2 is enabled due to stage F being set. A clock pulse generator (not shown) generates a continuous clock pulse train CP1 used to step counter CO1 and it is further supposed that at the occurrence of a clock pulse labelled O all stages of counter CO1 are set. As a result counter RCO is reset and the scale-of-2 SC/2 changes state due to AND-gate AND2 being activated so that RAM1A which was a "write RAM" now becomes a "read RAM". Consequently line 0 of the memory RAM1A is read out and stored into register REG. This means that in the left, middle and right part of this register the address of the junctor of destination Ju31, the address of the source time slot 0 and the address of the source module M4 connected to busbar SB4 are stored respectively. As a consequence thereof the following happens.

(1) Line 31 of RAM2 is read out since its read input and the input S3 of the 2-1 LDS 3 are both activated.

(2) All the multiplexers MUX0 to MUX7 are addressed with the binary code corresponding to 4 so that the speech information on busbar SB4 is selected and applied to the address input of memory RAM2 since each MUX has its input terminal 4 connected to a different wire of the 8 parallel wires constituting the above busbar.

(3) The output of comparator COMP is deactivated since the addresses stored in part STS of register REG (00000) and in part R' (11111) of counter CO1 are different.

At the occurrence of a clock pulse labelled 1 the counter CO1 is reset so that the write input W of RAM2 as well as the comparator's output and consequently also the enabling input E of RAM2 are activated. Since now also the S3 input of the 2-1 LDS3 is deactivated the bits selected from speech bus SB4 are registered in line 31 of this memory. At the same time the counter RCO is stepped since now the output of AND-gate AND3 is activated so that the information in line 1 of RAM1A is registered into REG.

At the occurrence of the next following clock pulse 2 the information selected from busbar SR13 is memorized in line 8 of RAM2, and the information of line 2 of RAM1A is registered into register REG.

At the occurrence of a clock pulse 3 the data information selected from busbar SB14 is memorized in line 7 of RAM2 and the information in line 3 of RAM1A is registered into register REG. Consequently, the comparator output is deactivated since now in part STS of register REG the binary address 1 is stored while all stages of the part R' of counter CO1 are still in the 0 state. The comparator's output remains deactivated until the occurrence of clock pulse 9.

At the occurrence of clock pulse 8 the output of the AND-gate AND1 is activated so that consequently line 0 of memory RAM2 is read out, the enabling input E being activated.

At the occurrence of the clock pulse 9 the read counter RCO is stepped again, the information selected from speechbus SB5 is memorized in line 16 of RAM2 and the information in line 4 of RAM1A is registered into register REG. From clock pulse 10 onward the comparator's output remains deactivated until the occurrence of clock pulse 17. The read counter RCO being then stepped whereby the information in line 5 of RAM1A is read out and the information from bus SB13 is registered in line 12 of RAM2. The same goes on until finally the counter CO1 has counted 256 whereby the information in line 31 of RAM2 is read out, the data information in line 0 of RAM1A is registered in register REG and the counter RCO is reset. Then the program can start again. It is to be noted that during the last time interval Dti7 of each time slot DTi a corresponding line i of RAM2 is read out.

To make this clearer, there is shown in FIG. 3 just below the time intervals Dti7 the corresponding line i read out from memory RAM2 during this time interval while below the other time intervals Dt00, Dt01, Dt02; Dt20, Dt21, ... Dt31, are shown the lines of the memory RAM2 wherein the information is stored which is read from a corresponding busbar during the time interval Dtij. As mentioned earlier, the information read out from memory RAM2 is decoded and demultiplexed in the D/A converter and D-MUX respectively and appears on the outputs of the demultiplexer, but only the information on output 31 is transmitted to the calling subscriber since only connecting through switch T31 has been closed, it being supposed that only called subscriber connected to junctor 31 in module M23 has hooked off.

Since the sampling frequency is 8 KHz and since a time frame DT is divided into 32 time slots each having 8 time intervals Dtij, the frequency of the latter corresponding to (8 KHz) (32) (8) = 2.048 MHz, which is the frequency of the clock pulse CP1 stepping the counter CO1. Finally, from the above description of the setting up of a connection it follows that the communication system is constituted of totally autonomous operating modules. Each module only contains information concerning itself and is able to gather the necessary information from other modules which are involved into a connection.

As mentioned above the number of time intervals Dtij per time slot DTi have been limited to eight. If N subscribers A0, A1, ..., AN-1 each connected to a different module and to which a same time slot DT0 for instance has been alotted must be able to communicate with N subscribers connected to a same or different modules the time slot DT0 should in principle be divided into N+1 equal time intervals of about $4/(N+1)$ microseconds. In the case of the communication system described above each time slot should then be divided into 25 time intervals 24 of which are alotted to a different subscriber, the 25th time interval being used to read out the memory RAM2. This time interval corresponds to a frequency of about 6 MHz. Yet, one adopts LSI circuits using MOS techniques for economical reasons in preference to TTL techniques, especially when in the circuit an extensive use of LSI circuits is foreseen, it is advisable to limit the frequency to about 2 MHz. On the other hand, the probability of having a traffic rate as high as 24 communications to which a same time slot may be allotted is very low. Indeed, it will be shown hereafter that the blocking probability, due to a called module being able to access only 7 out of 24 speech busses during any time slot, with a traffic density as high as 19 Erlang per module is extremely low (mean traffic 0.15E per subscriber—128 subscribers). This blocking probability turns out to be as low as $20.10^{-6}$ for a mean traffic value of 0.15E per subscriber and is much higher than the blocking probability of the concentrator network ($58.10^{-4}$).

The just defined blocking probability which will be called B is a function of n, the number of timeslots (n=32 for a line module) and k, the number of incoming communications per module to be divided over n time slots such that there are no more than 6 communications per time slot.

$$B = \sum_{k=7}^{32} P(k) Q(k,n) \tag{1}$$

where P(k)Q(k) is the probability of blocking of any time slot for any given value of k up to n but larger than 6 since when a time slot contains 7 communications blocking may occur, when a new incoming communication is directed to the same module.

In this formula P(k) is the probability (Erlang) to have k incoming communications for a same module and is given by $$P(k) = \frac{A^k/k!}{\sum\limits_{j=0}^{j=n} A^j/j!} \quad (2)$$

where A is the total traffic offered to the module.

The factor Q(k,n) in equation (1) is the probability that a time slot contains 7 incoming communications. It can be expressed as $$Q(k,n) = \frac{N(k,n)}{M(k,n)} \quad (3)$$

where M(k,n) is the number of ways k communications can be distributed among n time slots in such a manner that there are never more than 7 communications per time slot and N(k,n) is the number of ways to distribute k communications among n time slots in such a way there are 7 communications in one predetermined time slot and never more than 7 communications in the remaining n-1 time slots.

The number of ways M(k,n) can be computed for instance from the following recursive formula $$M(k,n) = M(k,n-1) + M(k-1, n-1) + \ldots \\ \ldots + M(k-7, n-1) \quad (4)$$

wherein the 8 terms in expression (4) are the number of ways to distribute k, k−1, ... k−7 communications in n−1 time slots with the respective remaining 0, 1, ..., 7 communications in the nth time slot.

The expression 4 can be simplified as follows $$M(k,n) = M(k,n-1) + M(k-1, n) - M(k-8, n-1) \quad (5)$$

which can easily be verified by writing out M(k−1, n) by using the expression (4). Thus a table can be built for M(k,n) with border values for
k=0 given by
M(0, n)=1
and for n=1 by
M(i, 1)=1, i≦7
M(i, 1)=0, i≧8
with n going up to 32 and k up to 7 a partially filled table for M(k,n) is

| k n | 0 | 1 | 2 | 3 | 4 | 5 | 6 | 7 | 8 | 9 | ... | 32 |
|---|---|---|---|---|---|---|---|---|---|---|---|---|
| 1 | 1 | 1 | 1 | 1 | 1 | 1 | 1 | 1 | 0 | 0 | ... | 0 |
| 2 | 1 | 2 | 3 | 4 | 5 | 6 | 7 | 8 | 7 | 6 | ... | 0 |
| 3 | 1 | 3 | 6 | 10 | 15 | 21 | 28 | 36 | | | ... | 0 |
| 4 | 1 | 4 | 10 | 20 | 35 | | | | | | | |
| .. | | | | | | | | | | | | |
| .. | | | | | | | | | | | | |
| .. | | | | | | | | | | | | |
| 32 | 1 | | | | | | | | | | | |

The value of N(k, n) (n=32) can be derived from the table by observing that N(k, n)=M(k−7, n−1).

The above relation expresses that the number of ways N(k, n) to allot 7 communications out of k communications to a predetermined time slot is equal to the number of ways M(k−6, n−1) to distribute k−7 remaining communications in n−1 time slots in such a way that there are no more than 7 communications per time slot.

The total traffic for a line module is $A = 2AL + AO + Ai$ wherein AL is the local traffic between subscribers connected to a same module or to two different modules of the same exchange, AO is the outgoing traffic from a subscriber to a distant exchange, Ai is the incoming traffic between a distant exchange and the above subscriber. Assuming that $AL=0.1A$, $AO=0.4A$ $Ai=0.4A$, and a mean traffic $\alpha = A/128 = 0.15$ Erlang (0.15E), the traffic at the receiver side of a module is
$AR = AL + Ai = 0.1A + 0.4A = 0.5A = 0.5 \times 128 \times 0.15 = 9.6 E$ The corresponding value for the blocking probability is $B = 20 \times 10^{-6}$. For a mean traffic density of 0.2 E, $B = 60 \times 10^{-5}$.

In the example described the concentrator network has two stages. Assuming an Engset distribution for the links between the first and second stages and an Erlang distribution after the second stages, the blocking probability is $C = 58 \times 10^{-4}$ and $81 \times 10^3$ for a mean traffic density $\alpha = 0.15E$ and $\alpha = 0.2E$ respectively, so that the blocking probability B is small with respect to the blocking probability C of the concentrator network itself. More about Erlang and Engset distributions can be found on pages 36 to 39 and 42 to 46 of D. Bear's book "Principles of telecommunication traffic engineering" published by Peter Peregrinus Ltd (First publication 1976).

The total blocking probability of an exchange for a local connection for instance can be written as $$1 - (1-B)^2 (1-C)^2$$

Since the square values and double products can be neglected as B and C are small so that the total blocking probability is
$$2B + 2C = 2(20 \times 10^{-6} + 58 \times 10^{-4}) \simeq 12 \times 10^{-3}$$

In the above a multi-module time division multiplex communication system has been described having the following particularities.

(1) The modules transmit to each other TDM data or voice (PCM) using a single type of interface. In particular each module contains an identical switch as distinct from switching systems using a concentrated switch performing the switching operations of the different modules.

(2) Each module contains its own micro processor and peripheral circuitry and the addition of extra modules does not require modifications in the existing modules. Each processor need only access devices in its own module and no central processor is essential.

(3) The required speed of the switches does not increase with the number of modules. This is achieved by allowing a very small but non-zero blocking probability, which is negligible as compared with the blocking probability elsewhere in the system. For a given mean traffic per line the corresponding blocking pobability is indepent of the number of modules.

Although "bus" has been used throughout this description in association with links enabling TDM communications (speech or data) inside a telecommunication exchange and while connections with distant exchanges or remote units can take place by using modules or units giving access to voice frequency or PCM trunks, bus should not be understood as necessarily imposing the same physical or geographical location for all the modules or units interconnected by said busses, e.g. with a trunk and two line modules one of the latter could be at a distant location.

While the principles of the invention have been described above in connection with specific apparatus, it is to be clearly understood that this description is made only by way of an example and not as a limitation on the scope of the invention.

We claim:

1. Time Division Multiplex (TDM) communication system including a plurality of TDM busses able to exchange signals through time slots on said busses and each time slot being divided into a number of time intervals, the invention in which the system is comprised of a plurality of modular units interconnected by said busses, each bus being connected to a plurality of terminal circuits, each unit including a signal processor, a space switch and a time switch, the space switch including means for forwarding during successive time intervals of a time slot, successive communication samples from distinct busses towards a time switch for shifting all said samples to another time slot and under the control of the signal processor individual to the unit, and wherein the number of said plurality of units is equal to the number of said plurality of busses and that each of said units includes a signal or data output circuit, the output of which is connected to a different bus of said plurality of busses and each unit includes a receiver circuit having a number of inputs which are also those of the space switch of that unit, the number of said inputs being at least equal to the number of said plurality of busses, each input connecting a different one of said busses with said space switch, selecting means in said time switch to enable said space switch to select from one of said busses TDM signals directed to that unit.

2. TDM communication system according to claim 1, wherein each of said units further includes an input circuit to which said terminal circuits are connected, said input circuit including a space switching network couplinginput lines of said terminal circuits to a number of junctor lines equal to the number of said time slots, a like number of hybrid circuits having two-wire, receive and send legs coupled between said junctor lines, input end output circuits respectively.

3. Time Division Multiplex (TDM) communication system including a plurality of TDM busses able to exchange signals through time slots on said busses and each time slot being divided into a number of time intervals, the invention in which the system is comprised of a plurality of modular units interconnected by said busses, each bus being connected to a plurality of terminal circuits, each unit including a signal processor, a space switch and a time switch, the space switch including means for forwarding during successive time intervals of a time slot, successive communication samples from distinct busses towards a time switch for shifting all said samples to another time slot and under the control of the signal processor individual to the unit, and wherein said signal processors are interconnected through a common control bus via which control information is interchanged between said processors.

4. TDM communication system according to claim 3, wherein a communication path between terminal circuits is established through the processor in a calling of said units which issues control information on said common control bus identifying the called unit, whereafter upon called one of the units having returned an acknowledgment signal on said common control bus, said calling unit issues further control information identifying the called terminal circuit within said called unit to enable the latter to set up a path inside the called unit and independently of a like path established in the calling unit.

5. TDM communication system according to claim 4, wherein to complete the communication path between terminal circuits, the processor of the calling and called units mutually exchange information concerning the paths established in their units and their addresses.

6. Time Division Multiplex (TDM) communication system including a plurality of TDM busses able to exchange signals through time slots on said busses and each time slot being divided into a number of time intervals, the invention in which the system is comprised of a plurality of modular units interconnected by said busses, each bus being connected to a plurality of terminal circuits, each unit including a signal processor, a space switch and a time switch, the space switch including means for forwarding during successive time intervals of a time slot, successive communication samples from distinct busses towards a time switch for shifting all said samples to another time slot and under the control of the signal processor individual to the unit, and wherein each said time switch includes memory means with associated writing and reading means and wherein the addresses of calling time slots allotted to a calling terminal circuit, the addresses of called time slots allotted to a called terminal circuit and the addresses of the calling unit are registered in the order of the calling time slots for each effective and requested communication, said memory means being read out by said reading means during successive allotted time intervals of said calling time slots except during the examination of the unallotted remaining time intervals of said same calling time slot during which inhibiting means are operative to suppress said read out.

7. TDM communication system according to claim 6, wherein said reading means and said inhibiting means are constituted by a read-out counter and a counter with associated clock pulse generator and a comparator comparing the address of the calling time slot with that of the corresponding most significant bits of said counter, this comparator giving an output signal to step said read-out counter when said addresses are equal.

8. TDM communication system according to claim 6, wherein said selecting means are constituted by address means provided by said memory means addressing said space switch with the address of a calling unit so that said space switch is able to select TDM bus signals destined to it and issued from the calling unit.

9. TDM communication system according to claim 6, wherein said memory means is constituted of two memories, one of which is used as a write memory while the other one is used to read out, said memories being switched from "write" to "read" memories and vice versa during the last time interval of the last frame time slot.

10. TDM communication system according to claim 6, wherein said time switch further includes second memory means wherein the calling TDM samples are stored in the order of the called time slots, said second memory being read out during the last time interval of said number of time intervals.

11. TDM communication system according to claim 2, wherein the blocking probability of the TDM connection between two units is substantially lower than that in said space switching network.

12. TDM communication system according to claim 2, wherein said space switching network is concentrator.

* * * * *